United States Patent [19]
Fradenburgh

[11] 3,884,594
[45] May 20, 1975

[54] VARIABLE LENGTH BLADE

[75] Inventor: Evan Albern Fradenburgh, Fairfield, Conn.

[73] Assignee: United Aircraft Corporation, East Hartford, Conn.

[22] Filed: Dec. 26, 1973

[21] Appl. No.: 428,480

[52] U.S. Cl. .................................................. 416/87
[51] Int. Cl. ........................................... B64c 11/28
[58] Field of Search .............................. 416/87–89

[56] References Cited
UNITED STATES PATENTS

| | | | |
|---|---|---|---|
| 2,145,413 | 1/1939 | Belfield | 416/88 |
| 2,163,482 | 6/1939 | Cameron | 416/88 |
| 3,297,094 | 1/1967 | Kisovec | 416/89 |
| 3,713,751 | 1/1973 | Fradenburgh | 416/87 |
| 3,768,923 | 10/1973 | Fradenburgh | 416/89 |

FOREIGN PATENTS OR APPLICATIONS

| | | | |
|---|---|---|---|
| 732,051 | 2/1943 | Germany | 416/88 |
| 1,188,946 | 4/1970 | United Kingdom | 416/88 |

*Primary Examiner*—Everette A. Powell, Jr.
*Attorney, Agent, or Firm*—Russell M. Lipes, Jr.

[57] ABSTRACT

A variable length blade in telescopic form adapted to be used with similar blades to form a variable diameter rotor or propeller and wherein the outer blade portion is caused to telescope with respect to the inner blade portion by jackscrew action and wherein the inner blade portion has a secondary internal torque tube to prevent jackscrew actuation torque from reacting against the main torque tube of the inner blade portion.

24 Claims, 9 Drawing Figures

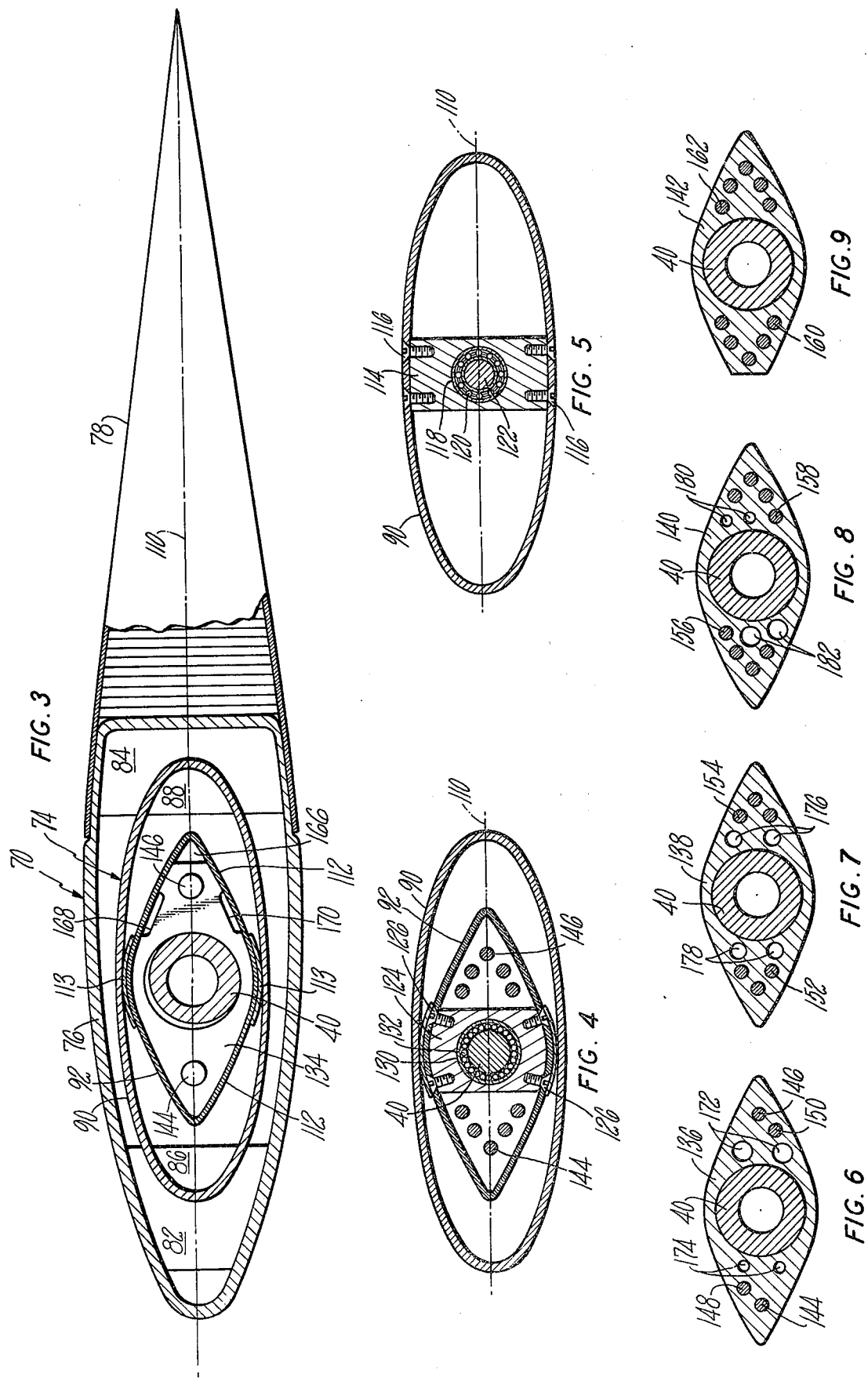

VARIABLE LENGTH BLADE

The invention herein described was made in the course of or under contract or subcontract thereunder with the Departmant of the Army.

CROSS-REFERENCE TO RELATED APPLICATIONS

This application teaches an improvement to the variable length blade construction disclosed in U.S. Pat. No. 3,768,923 issued Oct. 30, 1973 to Evan Albern Fradenburgh.

BACKGROUND OF THE INVENTION

1. Field of the Invention:

This invention relates to variable length blades adapted to be used in variable diameter rotors or propellers of the aircraft type and which consists of a telescoping blade actuated by a jackscrew arrangement wherein the outer blade portion is connected to the jackscrew through a plurality of nuts and tension-torsion straps.

2. Description of the Prior Art:

In the variable diameter helicopter rotor art, blades of telescopic construction have been caused to vary in length and hence vary the diameter of the rotor by means of a jackscrew mechanism. One such construction is shown in Cameron U.S. Pat. Nos. 2,163,481 and 2,163,482, but this construction did not anticipate high torque reaction loading of the inner blading during the time of blade length variation in flight, nor did the patents anticipate the need to accommodate continual cyclic pitch change such as modern helicopters experience. In the Cameron construction, a stiff tube connects a single nut on the jackscrew to the outer telescoping blade portion, and while such a construction was probably adequate at that time since Cameron's rotor rotates at relatively low speeds and the blades are not subject to cyclic pitch variation, modern helicopters having high tip speeds and high stress levels require extensive design improvements in this area.

Young U.S. Pat. No. 3,128,829 shows a telescoping blade construction very similar to the aforementioned Cameron patents and it includes the same operational limitations. Young teaches a continuous torque loading on the jackscrew/nut as the rotor drive means, thus imposing a twist upon the blade dependent upon rotor speed.

SUMMARY OF THE INVENTION

An object of the present invention is to provide an improved variable length rotor or propeller blade utilizing a jackscrew and nut arrangement to produce telescopic motion between inner and outer blade portions.

Another object of the invention is to provide an improved variable length rotor or propeller blade utilizing a jackscrew and nut arrangement in which the inner blade portion is constructed so that jackscrew actuation torque does not result in outer blade portion twisting and a corresponding lift and flapping response during blade length changes.

Still another object of the invention is to provide an improved variable length rotor or propeller blade utilizing a jackscrew and nut arrangement in which the inner blade portion construction is such that nut torque is transmitted directly to the blade root retention area to avoid imposing a torque on the outer outer blade portion which would result in an unwanted pitch change.

A further object of the invention is to provide, in a variable length rotor or propeller blade utilizing a jackscrew and nut arrangement, an inner blade portion having a duct system to direct centrifugally-pumped cooling air past the threads of the jackscrew during blade length changes to dissipate heat more rapidly, reduce maximum contact temperatures, and improve lubricant durability.

The foregoing and other objects, features and advantages of the invention become more apparent in the light of the following detailed description of a preferred embodiment thereof, as illustrated in the accompanying drawing.

BRIEF DESCRIPTION OF THE DRAWINGS

FIG. 3 is a showing along line 3—3 of FIG. 2.

FIG. 4 is a showing along line 4—4 of FIG. 2.

FIG. 5 is a showing along line 5—5 of FIG. 2.

FIGS. 6, 7, 8, and 9 illustrate individual nuts in the nut assembly along lines 6—6, 7—7, 8—8 and 9—9, respectively, of FIG. 2.

DESCRIPTION OF THE PREFERRED EMBODIMENT

Figure 1:
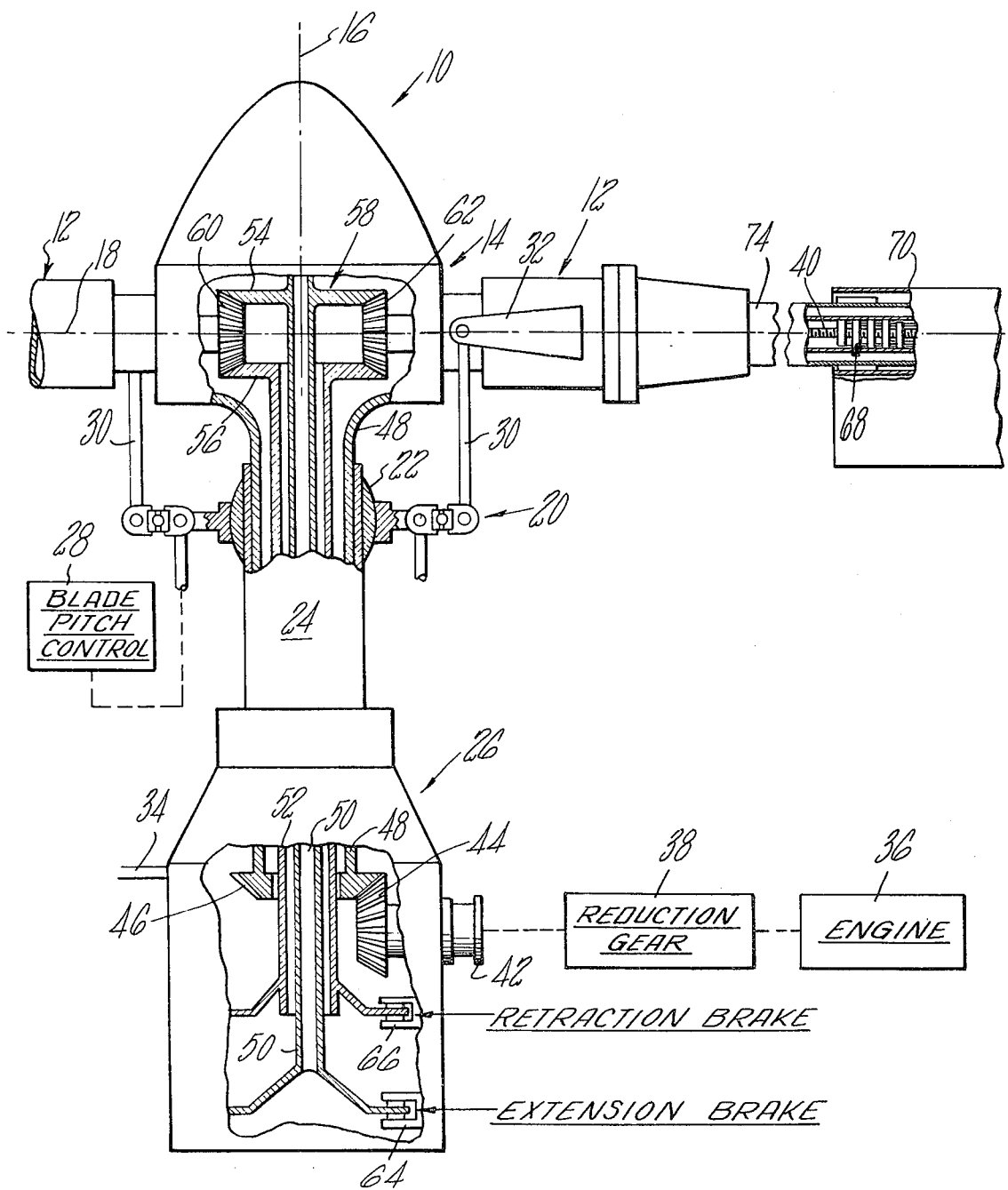
FIG. 1 is a partial showing, partially broken away, of a variable diameter rotor or propeller of a modern aircraft, such as a helicopter, illustrating my invention.

Referring to FIG. 1 a variable area blade in the environment of a variable diameter rotor 10 such as used on a modern helicopter is shown. The rotor also could be a propeller for a fixed wing aircraft. Rotor 10 consists of a plurality of equally spaced blades 12 projecting from rotor hub 14 for rotation therewith about rotor axis of rotation 16. Blades 12 are appropriately supported, as by stack bearings (not shown), for pitch change motion about blade feathering axis 18 so that the blades may change pitch both collectively and cyclically.

Swash plate assembly 20, which may be of the type more fully disclosed in U.S. Pat. No. 2,925,130, is supported from spherical bearing 22 and standpipe 24, which projects from the housing of the transmission unit 26. Blade pitch controls 28, which are conventional and may be of the type disclosed in U.S. Pat. No. 3,199,601, are utilized to translate swash plate assembly 20 along axis 16 and act through pivotal pitch change rod 30 and pitch change horn 32 to vary collectively the pitch of blades 12. Control 28 can also tilt swash plate assembly 20 with respect to axis 16 and thereby vary cyclically the pitch of the blades in conventional fashion. This cyclic pitch variation occurs throughout the rotation of blades 12.

Rotor 10 is supported from fuselage or wing 34 and is driven by engine 36 through reduction gear 38 and transmission 26. Engine 36 may be of the type shown in U.S. Pat. Nos. 2,711,631 and 2,747,367, and reduction gears 38 may be of the type shown in U.S. Pat. No. 2,911,851. While a rigid rotor is shown, the invention is equally applicable to an articulated rotor of the type shown in U.S. Pat. No. 2,925,130, with a universal joint (not shown) being used in jackscrew shaft 40.

Engine 36 drives transmission input drive shaft 42, which carries bevel gear 44 at one end thereof. Bevel gear 44 coacts with and drives bevel gear 46, which is connected to and drives rotor drive shaft 48 to thereby rotate rotor 10 about axis of rotation 16.

The mechanism which effects a change in diameter of rotor 10 also is shown in FIG. 1. Shafts 50 and 52 are positioned coaxially, by appropriate support bearings (not shown), about axis 16 and each carries at the upper end thereof bevel gears 54 and 56, respectively, which form part of differential 58, which also includes pinion gears 60 and 62 so that there is one such pinion gear for each blade 12 in rotor 10. These pinion gears 60 and 62 connect directly to jackscrew 40 in each blade 12.

As engine 36 drives rotor 10 about its axis 16, shafts 50 and 52 will rotate therewith. Each of the shafts 50 and 52 has a clutch or brake member 64 and 66, respectively, connected thereto. Both of these brakes are pilot operated in conventional fashion, for example, through a solenoid mechanism. When extension brake 64 is applied, shaft 50 and bevel gear 54 are stopped and, as rotor drive shaft 48 and hub 14 continue to rotate, the pinions such as 60 and 62 will be caused to rotate about their own axis and thereby rotate jackscrew 40. Nut assembly 68, which will be described in greater particularity hereinafter, threadably engages jackscrew 40 and is translatable along blade feathering axis 18 which coincides with the axis of the jackscrew. Nut assembly 68 is connected to movable outer blade portion 70 through a plurality of tension-torsion strap members indicated generally at 72. Translation of the nut assembly away from rotor hub 14 will permit centrifugal force to telescope or slide outer blade portion 70 outwardly with respect to inner blade portion 74, thereby increasing the diameter of rotor 10.

Application of retraction brake 66 will stop shaft 52 and bevel gear 56, and as rotor drive shaft 48 and hub 14 continue to rotate, pinions 60 and 62 will be caused to rotate about their own axis and thereby rotate jackscrew 40 in the opposite direction from that caused by application of extension brake 64. This will translate nut assembly 68 inwardly to act through tension-torsion straps 72 to telescope or slide outer blade portion 70 inwardly toward hub 14 with respect to inner blade portion 74, thereby reducing the diameter of rotor 10. It will be evident that the pitch and hand of the threads of jackscrew 40 and nut assembly 68 determine the rate of diameter change of rotor 10 and whether the diameter will increase or decrease.

Figure 2:
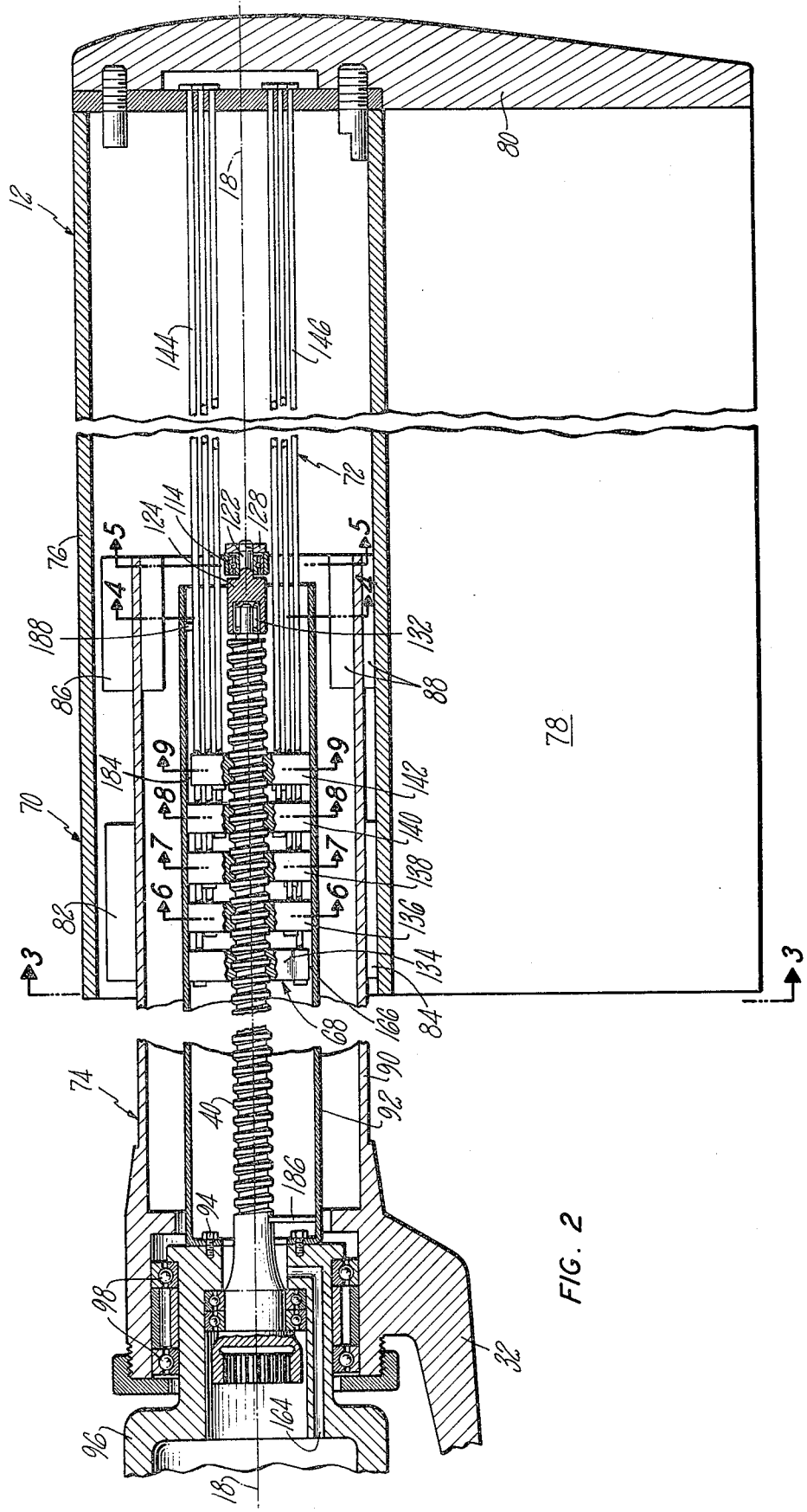
FIG. 2 is a top view, partially broken away, illustrating my invention used in a variable length rotor blade.

FIGS. 2 and 3 show details of construction of blade 12 including the nut assembly and strap member connection of the inner blade portion with the outer blade portion. Outer blade portion 70 is of airfoil cross-section, and inner blade portion 74 is of generally elliptical cross-section. The outer blade portion consists of spar 76 and trailing edge 78 and may be constructed in accordance with the teaching of my U.S. Pat. No. 3,713,751. Blade tip cap 80 comprises the outboard end of outer blade portion 70 to provide a properly shaped aerodynamic tip therefor. Spar bearing blocks 82 and 84 attached to spar 76 and tube bearing blocks 86 and 88 attached to inner blade portion 74 guide outer blade portion 70 in its telescoping motion inwardly and outwardly with respect to inner blade portion 74. Details of the bearing block attachment as well as other constructional features of the blade are disclosed in my U.S. Pat. No. 3,768,923.

Inner blade portion 74 consists of torque tube 90, defining the external surface of the blade portion, and generally diamondshaped internal torque tube 92 containing jackscrew 40 and nut assembly 68. Pitch change horn 32 is connected to torque tube 90 for changing the pitch of the blade. The internal torque tube has a relatively fixed position since it is connected by bolts 94 to spindle 96 which is part of rotor hub 14 and the blade root retention. Bearings 98 between the spindle and torque tube 90 permit pitch changing rotation of torque tube 90 and outer blade portion 70 about feathering axis 18 with respect to the relatively fixed internal torque tube 92 and its connected spindle. This can be seen in FIG. 3 in which the major axis of inner torque tube 92 is aligned with chordal axis 110. Upon a change in pitch of the blade, torque tube 90 and outer blade 70 move together about feathering axis 18 in a clockwise or counterclockwise direction, the movement being permitted by, and limited by, the relatively flat outer surfaces 112 of internal torque tube 92. Low friction scuffer plates 113 run the length of the two torque tubes and minimize friction between adjacent torque tube surfaces.

As shown, the orientation of internal torque tube 92 is such that its pitch angle with respect to the horizon, or blade flat pitch axis, is zero. This will allow equal positive and negative blade pitch deviations or excursions. In usual helicopter operation, the range of positive pitch is greater than that of negative pitch. Thus, it may be desirable to provide the internal torque tube with an installed pre-pitch of several degrees. Sufficient clearance is necessary to avoid contact of a twisted internal torque tube with the external torque tube.

Support for the outboard end of internal torque tube 92, as well as for the outboard end of jackscrew 40, is shown in FIGS. 4 and 5. Outer support 114, as can be seen in FIG. 5, is mounted near the outboard end of external torque tube 90, being retained in place between the upper and lower portions of the torque tube by screws 116. Bore 118 through the support houses anti-friction bearing 120 which surrounds extension 122 projecting from the outboard face of inner support 124. This inner support is mounted adjacent outer support 114 near the outboard end of internal torque tube 92. As can be seen in FIG. 4, inner support 124 is retained in place between the upper and lower portions of torque tube 92 by screws 126, and nut 128 (FIG. 2) on extension 122 secures the inner support with respect to the outer support. The inboard face of inner support 124 has bore 130 therein for receiving the outboard end of jackscrew 40. Needle bearing 132 in the bore supports the jackscrew end. By virtue of the structure just described, the outboard ends of the jackscrew and the internal torque tube are centered and supported with respect to the external torque tube; the external torque tube can rotate with respect to the internal torque tube by virtue of bearing 120 to effect blade pitch angle changes; and the jackscrew can turn independently of the internal torque tube by virtue of bearing 132. Further, the structure provides a degree of structural redundancy for the external torque tube, and tends to restrain the jackscrew and torque tube elements in the event of structural failure.

To translate outer blade portion 70 with respect to inner blade portion 74, jackscrew 40 is caused to rotate in one direction or the other by the brake mechanism disclosed and described in connection with FIG. 1. Rotation of the jackscrew results in nut assembly 68, because of rotational confinement by internal torque tube 92, translating along the axis of the jack-screw. This axis coincides with blade feathering axis 18. The nut assembly includes a plurality of individual nuts 134, 136, 138, 140 and 142, FIGS. 2, 3 and 6–9. At least one tension-torsion strap extends from each opposite side of each nut and connects to blade tip cap 80. For example, straps 144 and 146 extend from the most inboard nut, 134, through holes in the other nuts to tip cap 80. Each strap has an enlarged head portion which bears against the first nut the strap is in contact with and which together with the connection of the strap to the tip cap provides for tension loading on the strap during blade rotation. Straps 148 and 150 extend from nut 136 to the tip cap, (FIG. 6), straps 152 and 154 extend from nut 138 to the tip cap (FIG. 7); straps 156 and 158 extend from nut 140 to the tip cap (FIG. 8); and straps 160 and 162 extend from nut 142 to the tip cap (FIG. 9).

As can be seen in FIG. 3 particularly, as well as in FIGS. 6-9, the nuts in nut assembly 68 are of generally diamond shape and conform closely to the interior surface of internal torque tube 92. Any tendency of the nuts to rotate because of jack-screw actuation torque or high centrifugal loading is resisted by the internal torque tube. Nut torque is transmitted through the internal torque tube and the spindle directly to the blade root retention area, thus avoiding imposing a torque on the outer torque tube. Because the outer torque tube controls the pitch of the outboard blade, elimination of the internal torque reaction from the outer torque tube prevents a blade twisting effect and a corresponding lift and flapping response during rotor diameter reduction or extension. The internal torque tube will twist in reaction to nut torque, but the angular clearance between the internal and external torque tubes allows a substantial torsional deformation before contact.

As an alternate means of support for internal torque tube 92, when used in propeller type environment wherein cyclic pitch is not required, both external torque tube 90 and internal torque tube 92 may be integral at the blade root. This will impart any diameter change twisting load to the control system and still allow relative twisting between the two torque tubes.

The internal torque tube has an additional advantage. It can be used as a shroud in a duct system to direct centrifugally-pumped cooling air past the threads of the jackscrew during rotor blade diameter changes in order to dissipate frictional heat more rapidly, reduce maximum contact temperatures, and improve nut lubricant durability. This system employs air passageways through the nuts in a manner to ensure that air flows past the threads between adjacent nuts. It also employs simple baffles to be used to automatically block the flow of cooling air at the two extremes of rotor diameter, thus avoiding any centrifugal pumping power except during blade length changes.

Cooling air is admitted to the interior of blade 12 in FIG. 2 through passage 164 in spindle 96. The air then flows past nut 134 by means of opening 166 defined between the right end of the nut, as viewed in FIG. 3, and the internal torque tube, and notches 168 and 170 on the surface of the nut. The opening alone could be used, or one or more notches or holes without the opening could be used as an air passage past the first nut, but the relative location of this passage is related to the path the cooling air is to take as it flows across the jackscrew threads and through or past the nuts. The air then flows across the jackscrew threads and through two sets of holes, 172 and 174, in the next nut, 136. Holes 172 on the right side of the nut are individually larger than holes 174 on the left side of the nut, the purpose being to direct a proportionately greater airflow through air passage holes on the right side of the nut, in line with the air passage defined by or through the first nut, than through air passage holes on the left side of the nut while still forcing the cooling air across the jackscrew threads to the other side of the nut.

The cooling air next passes across the jackscrew threads and through two sets of holes, 176 and 178, in nut 138. These holes are all of the same size, a size intermediate of the size of holes 172 and 174 in nut 136, so that the airflow through the two sides of the nut is balanced. The cooling air then passes across the jackscrew threads and through holes 180 and 182 in nut 140. Holes 180 on the right side of the nut are the same relatively small size as holes 174 on the left side of upstream nut 136, and holes 182 on the left side of nut 140 are the same relatively large size as holes 172 on the right side of upstream nut 136. Thus there is a proportionately greater cooling airflow through the left side of nut 140 than through the right side. Finally, the cooling air flows across the jackscrew threads and past nut 142 through opening 184 (FIG. 2) defined between the left end of the nut and the internal torque tube. The cooling air then is vented to atmosphere through a suitable opening in the outer blade structure.

Baffle 186 is mounted within internal torque tube 92 at a blade span position corresponding to the inboard or blade retracted position of nut 134. In this position, the baffle masks the air passage opening in the nut so as to prevent cooling airflow. Baffle 188 is mounted within the torque tube at a position corresponding to the outboard or blade extended position of nut 142. The baffle masks the air passage opening in the nut to cut off cooling airflow when the blade is extended. Thus, cooling air flows past the nuts in nut assembly 68 and over the threads on jackscrew 40 during transients in blade length between its retracted and extended positions. This is the time when frictional heat is being generated in the jackscrew and nut assembly and when lower surface temperature and heat dissipation is desirable.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A variable length blade for aircraft comprising an inner blade portion and
   an outer blade portion which telescopes with respect to said inner blade portion;
   said inner blade portion including an external torque tube,
   and an internal torque tube;
   means within said internal torque tube for telescoping said outer blade portion,
   said internal torque tube being relatively fixed against rotation and translation;

and means associated with said external torque tube and said outer blade portion for changing the pitch of said outer blade portion.

2. A variable length blade for aircraft according to claim 1 in which the means within the internal torque tube for telescoping said outer blade portion includes a jackscrew.

3. A variable length blade for aircraft according to claim 1 in which the means within the internal torque tube for telescoping said outer blade portion is a jackscrew, nut assembly and tie-strap arrangement.

4. A variable length blade for aircraft according to claim 1 having means for supporting said internal torque tube with respect to said external torque tube.

5. A variable length blade for aircraft according to claim 2 having means for centering and supporting said jackscrew with respect to said internal torque tube.

6. A variable length blade for aircraft according to claim 5 having means for centering and supporting said jackscrew and said internal torque tube with respect to said external torque tube.

7. A variable length blade for aircraft according to claim 4 in which the supporting means includes means permitting relative rotation of said external torque tube with respect to said internal torque tube.

8. A telescoping hub mounted rotor blade for a helicopter;
said rotor blade including an inner blade portion, and an outer blade portion capable of sliding over said inner blade portion to vary blade length;
actuating means within said inner blade portion for causing sliding of said outer blade portion; and
means within said inner blade portion and connected to the hub for resisting torque loading imposed on said actuating means during outer blade portion sliding.

9. A telescoping rotor blade according to claim 8 in which the torque resisting means within said inner blade portion includes a torque tube.

10. A telescoping rotor blade according to claim 8 in which the inner blade portion includes an external torque tube, and the torque resisting means within the inner blade portion is a torque tube substantially coextensive in length with the external torque tube.

11. A telescoping rotor blade for a helicopter;
said rotor blade having an inner blade portion, and an outer blade portion constructed to slide over said inner blade portion to vary blade length;
said inner blade portion having a first structural member defining its external surface;
means within said first structural member for moving said outer blade portion to change blade length; and
a second structural member within and independent of said first structural member for absorbing torque loading imposed on said moving means by changes in blade length.

12. A telescoping rotor blade according to claim 11 in which the first and second structural members are torque tubes.

13. A telescoping rotor blade according to claim 12 in which the outer blade portion is of airfoil cross-section.

14. A telescoping rotor blade according to claim 12 in which the means for moving said outer blade portion includes a jackscrew and nut arrangement with means for connecting the nut arrangement to the outer blade portion.

15. A telescoping rotor blade according to claim 14 in which the means connecting the nut arrangement to the outer blade portion comprises a plurality of tie straps.

16. A telescoping rotor blade according to claim 11 including means for supporting the outboard end of said second structural member within said first structural member.

17. A telescoping rotor blade according to claim 16 in which the supporting means includes means permitting rotation of said first structural member and said outer blade portion about said second structural member.

18. A telescoping rotor blade in accordance with claim 11 including means for pumping cooling air over said outer blade moving means during changes in blade length.

19. A telescoping rotor blade in accordance with claim 18 in which the second structural member serves as a shroud defining the cooling air passage.

20. A telescoping rotor blade for a helicopter;
said rotor blade having an inner blade portion, and an outer blade portion constructed to slide over said inner blade portion to vary blade length;
said inner blade portion having a first structural member defining its external surface;
a second structural member within said first structural member;
a jackscrew and nut arrangement within said second structural member for moving said outer blade portion to change blade length;
said nut arrangement including a plurality of nuts;
means for admitting cooling air to said jackscrew and said nuts;
and means associated with said nuts for proportioning the flow of cooling air past said nuts.

21. A telescoping rotor blade according to claim 20 in which the second structural member defines a cooling air passage.

22. A telescoping rotor blade according to claim 20 in which a portion of each nut is removed to define a passage for the flow of cooling air.

23. A telescoping rotor blade according to claim 20 having means limiting the flow of cooling air when the outer blade portion is in its minimum or maximum blade length positions.

24. A telescoping rotor blade according to claim 23 in which said cooling flow limiting means are baffles mounted within said second structural member.

* * * * *